US009070496B2

(12) United States Patent
Arakawa

(10) Patent No.: US 9,070,496 B2
(45) Date of Patent: Jun. 30, 2015

(54) ROTATABLE CONNECTOR DEVICE

(71) Applicants: FURUKAWA ELECTRIC CO., LTD., Tokyo (JP); FURUKAWA AUTOMOTIVE SYSTEMS INC., Shiga (JP)

(72) Inventor: Hayato Arakawa, Shiga (JP)

(73) Assignees: FURUKAWA ELECTRIC CO., LTD., Tokyo (JP); FURUKAWA AUTOMOTIVE SYSTEMS INC., Shiga (JP)

(*) Notice: Subject to any disclaimer, the term of this patent is extended or adjusted under 35 U.S.C. 154(b) by 193 days.

(21) Appl. No.: 13/898,129

(22) Filed: May 20, 2013

(65) Prior Publication Data
US 2013/0248220 A1 Sep. 26, 2013

Related U.S. Application Data

(63) Continuation of application No. PCT/JP2011/076761, filed on Nov. 21, 2011.

(30) Foreign Application Priority Data

Nov. 19, 2010 (JP) ................. 2010-258780

(51) Int. Cl.
*H01R 3/00* (2006.01)
*H01B 17/14* (2006.01)
*B60R 16/027* (2006.01)
*H01R 35/02* (2006.01)

(52) U.S. Cl.
CPC ............. *H01B 17/14* (2013.01); *B60R 16/027* (2013.01); *H01R 35/025* (2013.01); *H01R 2201/26* (2013.01)

(58) Field of Classification Search
CPC .................................................... H01R 35/025
See application file for complete search history.

(56) References Cited

U.S. PATENT DOCUMENTS

| 6,224,406 | B1* | 5/2001 | Takahashi et al. ............ 439/164 |
| 6,299,454 | B1* | 10/2001 | Henderson et al. ............. 439/19 |
| 7,175,454 | B2* | 2/2007 | Araki et al. ................... 439/164 |
| 8,808,016 | B2* | 8/2014 | Adachi et al. ................. 439/164 |
| 8,851,901 | B2* | 10/2014 | Hiroki .............................. 439/15 |
| 2013/0095671 | A1* | 4/2013 | Arakawa ......................... 439/15 |
| 2013/0095672 | A1* | 4/2013 | Hirai ............................... 439/15 |

(Continued)

FOREIGN PATENT DOCUMENTS

| JP | 2001-126836 A | 5/2001 |
| JP | 2009-217974 A | 9/2009 |

(Continued)

OTHER PUBLICATIONS

International Search Report issued in Application No. PCT/JP2011/076761, dated Dec. 20, 2011 (1 page).

*Primary Examiner* — James Harvey
(74) *Attorney, Agent, or Firm* — Osha Liang LLP

(57) ABSTRACT

The object is to allow rotatable rollers to rotate smoothly. Rotatable rollers axially supported by bearings provided in a retainer so as to be rotatable include legs, each of which has an engaging part engageable with the corresponding bearing. A sliding part of the leg which is slidable against an inner circumferential surface of the bearing has a cross-sectional shape which is contactable with the inner circumferential surface over a width smaller than a width of the leg.

4 Claims, 8 Drawing Sheets

(56) References Cited

U.S. PATENT DOCUMENTS

2013/0248220 A1* 9/2013 Arakawa .................. 174/79
2013/0252441 A1* 9/2013 Yamaguchi .................. 439/15

FOREIGN PATENT DOCUMENTS

| | | |
|---|---|---|
| JP | 2010-003514 A | 1/2010 |
| JP | 2010-003515 A | 1/2010 |

* cited by examiner

ROTATABLE CONNECTOR DEVICE

TECHNICAL FIELD

The present invention relates to a rotatable connector device for electrically connecting elements on the side of a steering wheel of an automobile and a vehicle body side to each other.

BACKGROUND ART

A rotatable connector device which is mountable on a vehicle such as an automobile or the like includes a cable housing having a stator and a rotator which are coaxially attached to each other so as to be rotatable with respect to each other.

In the cable housing of such a rotatable connector device, the stator is fixed to a vehicle body and the rotator is attached to a steering wheel. In addition, the rotatable connector device includes flat cables accommodated in an accommodation space in the cable housing. Owing to this structure, the rotatable connector device electrically connects, for example, a horn module and an airbag module provided on the side of the steering wheel and a power supply on the vehicle body side to each other via the flat cables.

Patent Document 1, for example, describes a rotatable connector device including a retainer, located on a bottom surface of the accommodation space, for guiding the flat cables to rotate around an axis of the steering wheel. Such a retainer includes a plurality of rotatable rollers. The plurality of rotatable rollers assist the flat cables in being rotated in the accommodation space in a winding or rewinding direction, so that the rotatable connector device can follow the steering operation to rotate smoothly.

A rotation shaft of each of the rotatable rollers described in Patent Document 1 has a snap-fit structure, and is coupled to a bearing of the retainer in a snap-fit manner (see FIG. 3 of Patent Document 1).

In a radial-direction cross-section of a sliding part along which the rotation shaft of such a rotatable roller and the bearing of the retainer slide against each other (see FIG. 8A), a leg 455 having the snap-fit structure has a cross-sectional shape which is along an inner circumferential surface 43b of the bearing (see FIG. 8B).

While the rotatable connector device including the rotatable rollers is rotated, if a foreign object is stuck in the sliding part of the retainer and each rotatable roller, the foreign object is not easily removed because the size of the area along which the rotation shaft and the bearing slide against each other is large. This causes a problem that the rotatable rollers cannot rotate smoothly. In addition, due to the foreign object stuck in the sliding part, burr or the like is generated in the sliding part on the bearing side or the rotation shaft side, which influences the rotation of the rotatable rollers.

Such a foreign object may enter from outside during the assembly of the rotatable connector device, or may be caused by burr or the like which is generated during the molding of the retainer or the rotatable rollers and is not removed thereafter.

CITATION LIST

Patent Literature

Patent Document 1: Japanese Laid-Open Patent Publication No. 2009-217974

SUMMARY OF INVENTION

Technical Problem

The present invention made in light of the above problem has an object of providing a rotatable connector device capable of rotating rotatable rollers more smoothly.

Solution to Problem

The present invention is directed to a rotatable connector device including a rotator including a ring-shaped rotatable-side ring plate and an inner cylindrical section having a cylindrical shape and formed along an inner circumferential edge of the rotatable-side ring plate, and a stator including a ring-shaped fixed-side ring plate and an outer cylindrical section having a cylindrical shape and formed along an outer circumferential edge of the fixed-side ring plate, the rotator and the stator being engaged with each other so as to be rotatable with respect to each other in a clockwise direction and a counterclockwise direction. An accommodation section is defined by the rotatable-side ring plate and the inner cylindrical section of the rotator and the fixed-side ring plate and the outer cylindrical section of the stator. A ring-shaped retainer for axially supporting a plurality of rotatable rollers is located on a bottom surface of the accommodation section. In a part of the accommodation section above the retainer, flat cables for electrically connecting the rotator and the stator to each other are accommodated along the rotatable rollers, such that the flat cables are wound and rewound. Bearings provided in a circumferential direction of the retainer axially support, respectively, rotation shafts included in the rotatable rollers such that the rotation shafts are rotatable. Each of the rotation shafts includes a plurality of legs located in a circumferential direction thereof and each having a sliding part slidable against a circumferential surface of the bearing, and an engaging part formed at a tip of each leg and engageable with a circumferential edge of the bearing. At least the sliding part of each leg is formed to have a radial-direction cross-sectional shape which is point-contactable with the bearing, or line-contactable with the bearing over a contact width smaller than a circumferential-direction width of the leg.

The circumferential surface may be an outer circumferential surface of the bearing or an inner circumferential of the bearing.

According to the present invention, the rotation shaft and the bearing can slide against each other in a point-contact state, or a line-contact state over a width smaller than the circumferential-direction width of the leg, at least in a radial-direction cross-section. In the case where the leg of the rotation shaft has a shape contactable with the circumferential surface in the axial direction to a certain degree, the rotation shaft and the bearing can slide against each other in a line-contact state or a plane-contact state in the axial direction. Therefore, whether the rotation shaft and the bearing contact each other in a point-contact state or in a line-contact state at least in the radial-direction cross-section, the size of the area along which the rotation shaft and the bearing slide against each other is decreased. Thus, a foreign object does not easily enter the sliding part of the rotation shaft against the bearing. Even if being stuck, the foreign object can be easily discharged.

In addition, the risk that the rotatable rollers rotate while a foreign object is stuck at the sliding part of the rotation shaft against the bearing can be reduced. Thus, the risk that burr or fin is generated at the sliding part of the rotation shaft or on the circumferential surface of the bearing due to the foreign object can be suppressed. Since generation of damage due to the foreign object can be suppressed, the rotatable rollers can rotate smoothly without being stuck.

In an embodiment of the present invention, a part of the radial-direction cross-section facing the bearing may have a protruding part protruding in a mountain-like shape toward the bearing.

According to the present invention, even if the leg is inclined or twisted at the time when, for example, the rotation direction of the rotatable roller is changed by the flat cables being wound or rewound, the sliding part can be kept in point-contact or line-contact with the circumferential surface at least in the radial-direction cross-section. In addition, a corner formed of a surface of the leg facing the bearing and a radial-direction surface of the leg can move without contacting the circumferential surface. Therefore, burr formed at the corner during the molding is not caught at the sliding part. Thus, smooth rotation of the rotatable roller is not inhibited by such burr, and a situation where the burr at the corner comes off and acts as a foreign object is prevented. In addition, a situation can be prevented where at the time when the rotation direction of the rotatable roller is to be changed, the corner contacts the circumferential surface and causes the rotatable roller to be stuck and inhibited from smoothly inverting the rotation direction thereof.

In an embodiment of the present invention, the protruding part may have a radius of curvature smaller than that of the bearing.

The radius of curvature indicates a curving degree of a curved line at an optional point. As the radius of curvature is smaller, the curved line is curved sharply.

According to the present invention, the surface of the leg of the rotatable roller facing the bearing has a curved shape which is not along the circumferential surface of the bearing. Thus, the sliding part can be more stably kept in a point contact state or a line contact state in at least the radial-direction cross-section, against inclination or twisting of the leg. The curved shape is not limited to an arc shape having a constant radius of curvature, and may be a curved shape at an end of an elliptic shape in a longer axis direction.

In an embodiment of the present invention, the engaging part may be hook-shaped and projects in the radial direction to be engaged with the circumferential edge.

According to the present invention, the rotatable roller is firmly engaged with the circumferential edge of the bearing and thus is restricted from moving in the axial direction by an external force such as vibration or the like. In addition, the rotation shaft is prevented from easily coming off from the bearing, and thus a rotation fault of the rotatable roller can be avoided.

Advantageous Effects of Invention

According to the present invention, a rotatable connector device capable of rotating rotatable rollers more smoothly can be provided.

DESCRIPTION OF EMBODIMENTS

Hereinafter, an embodiment of the present invention will be described with reference to the drawings.

Figure 1:
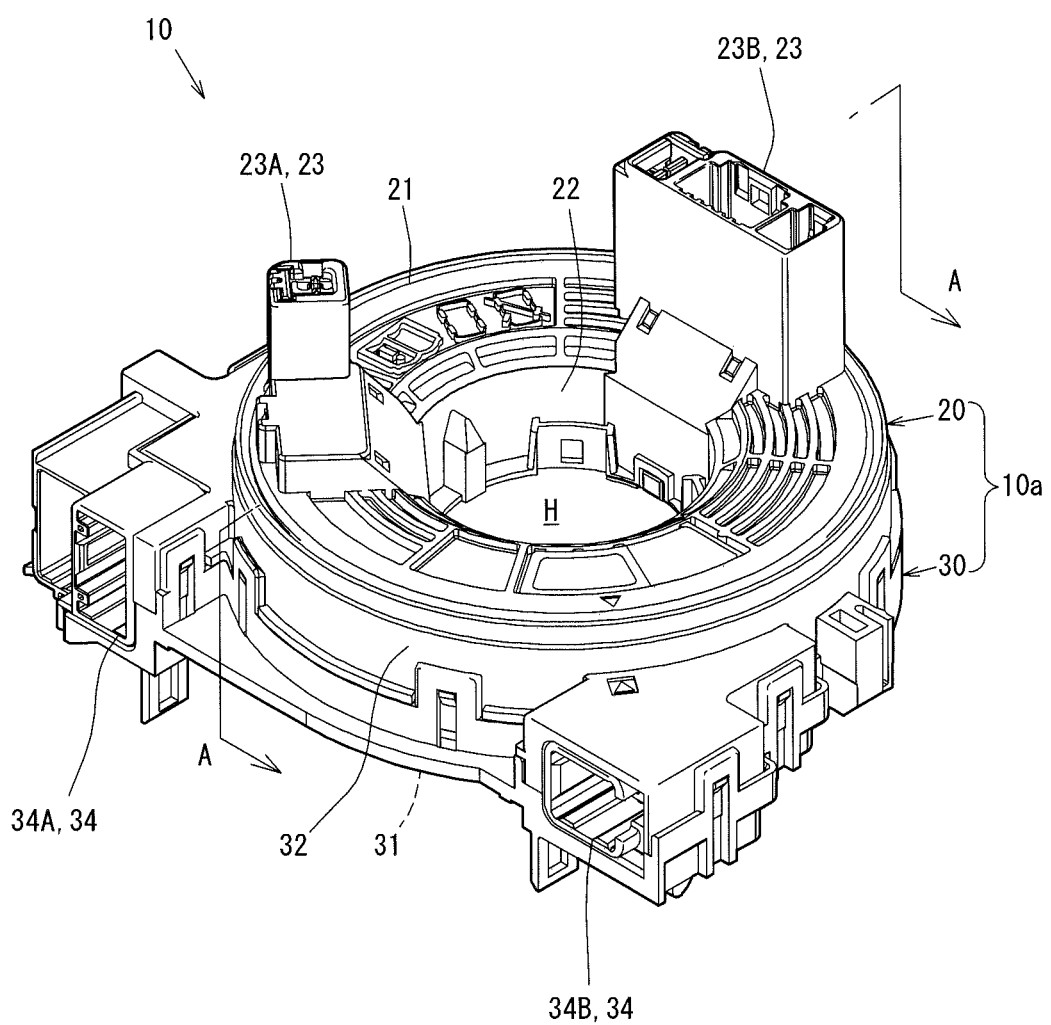
FIG. 1 is an isometric view showing an external appearance of a steering roll connector in an embodiment.
Figure 2:
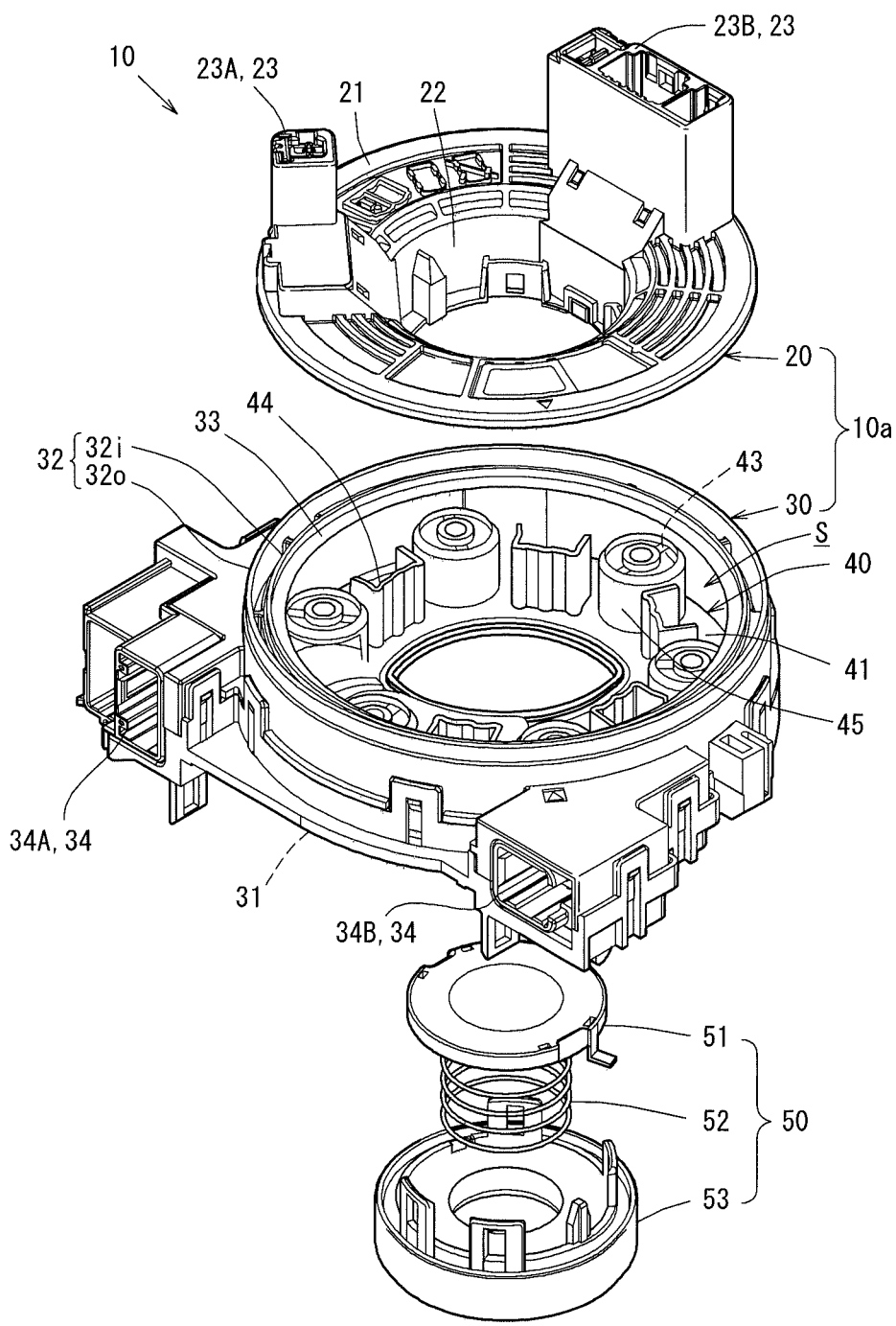
FIG. 2 is an exploded isometric view showing an exploded state of the steering roll connector in the embodiment.
Figure 3:
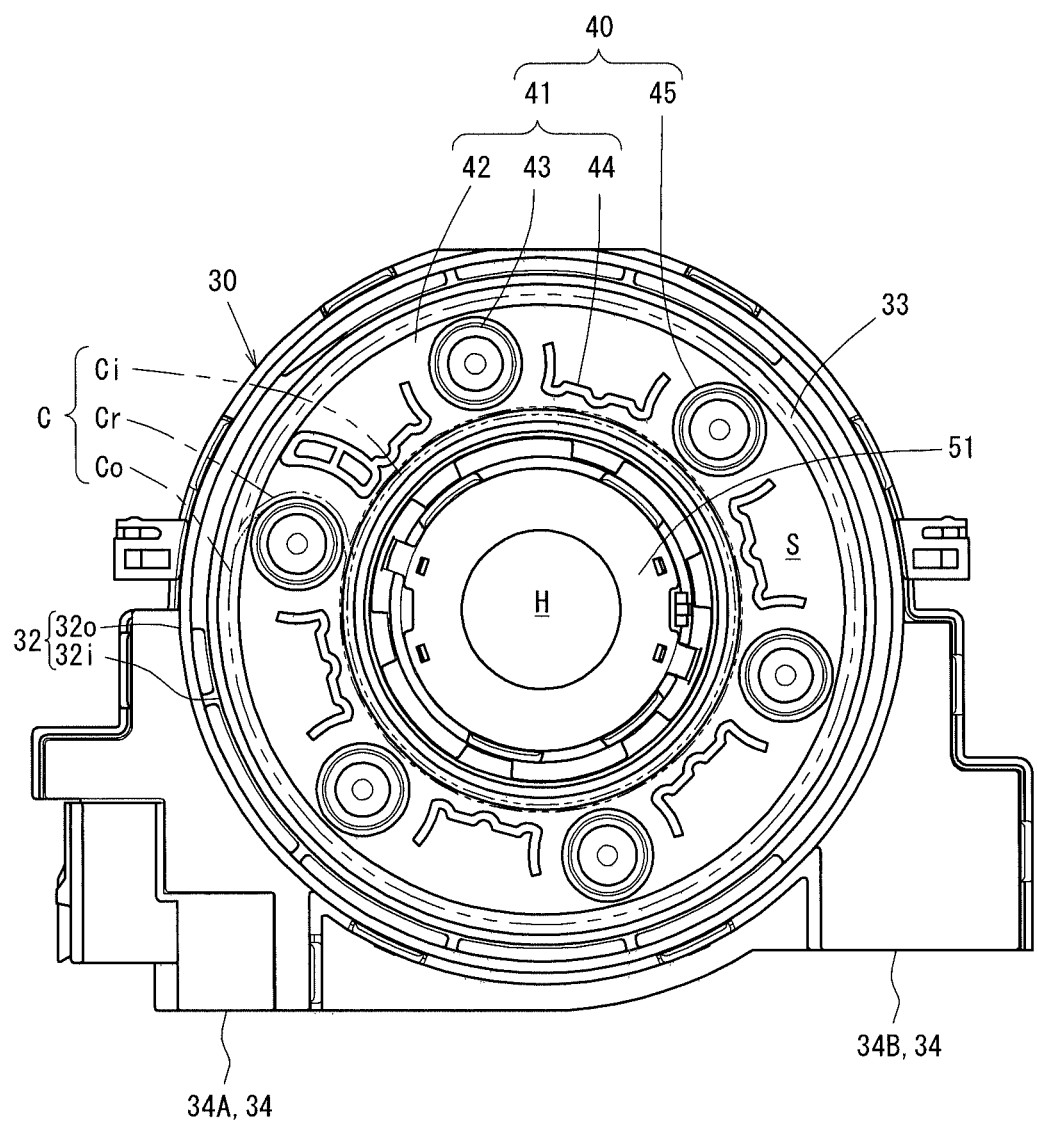
FIG. 3 is a plan view of the steering roll connector in the embodiment in the state where a rotator has been detached.
Figure 4:
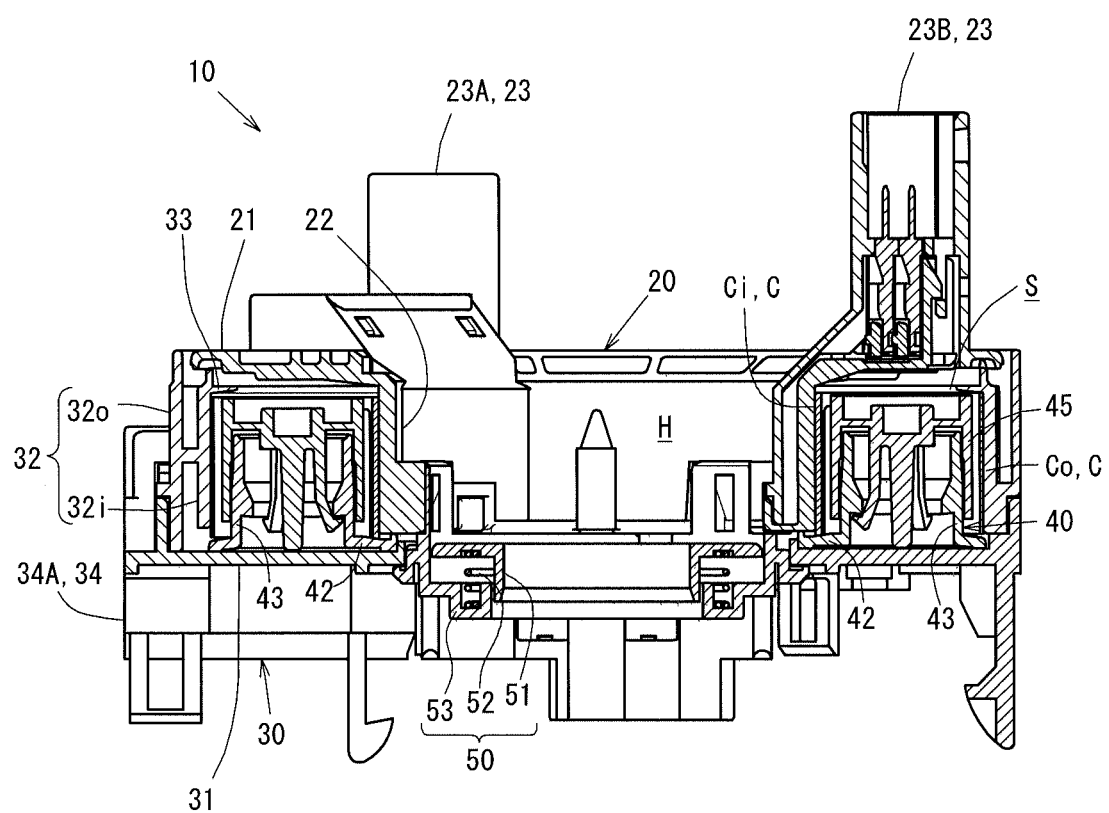
FIG. 4 is a cross-sectional view taken along line A-A in FIG. 1.

FIG. 1 is an isometric view of an external appearance of a steering roll connector 10 in this embodiment. FIG. 2 is an exploded isometric view showing an exploded state of the steering roll connector 10 in this embodiment. FIG. 3 is a plan view of the steering roll connector 10 in this embodiment in the state where a rotator 20 has been detached. FIG. 4 is a cross-sectional view taken along line A-A in FIG. 1.

As shown in FIG. 1 through FIG. 4, the steering roll connector 10 in this embodiment includes a cable housing 10a, a retainer 40, and a rotation lock structure 50.

As shown in FIG. 3 and FIG. 4, the cable housing 10a is generally cylindrical and has an insertion hole H running through the cable housing 10a in a rotation axis direction (up-down direction in FIG. 4). The insertion hole H is formed at a central part of the cable housing 10a when seen in a plan view. The insertion hole H is formed to have a diameter which allows a steering shaft (not shown) projecting from a steering column (not shown) to be inserted thereto. The cable housing 10a includes a stator 30 and a rotator 20 which are rotatable with respect to each other.

At a top end of the steering shaft, a steering wheel for making a rotation operation is fixed.

As shown in FIG. 2, the rotator 20 includes a rotatable-side ring plate 21 formed to be ring-shaped and acting as a top plate, and an inner cylindrical section 22 having a cylindrical shape and extending downward from an inner circumferential edge of the rotatable-side ring plate 21.

The rotator 20 is fixed to, and is rotatable integrally with, the steering wheel. In more detail, the rotator 20 can rotate around the same axis as the rotation axis of the steering wheel.

To the rotator 20, rotator-side connectors 23 rotatable integrally with the rotator 20 along with the rotation thereof are attached.

The rotator-side connectors 23 include a first rotator-side connector 23A and a second rotator-side connector 23B. The first rotator-side connector 23A and the second rotator-side connector 23B are located with a prescribed distance kept therebetween in a circumferential direction of the rotatable-side ring plate 21, and connection openings thereof are directed upward.

The rotator-side connectors 23 (23A, 23B) are each connected to a cable (not shown) drawn from an electrical circuit of, for example, a horn switch, an airbag unit or the like attached to the steering wheel.

The stator 30 is fixed to an appropriate member on the side of a vehicle body, for example, a combination bracket switch (not shown) located inside the steering column so as to be rotatable with respect to the steering wheel. As shown in FIG. 2, the stator 30 includes a fixed-side ring plate 31 formed to be ring-shaped and acting as a bottom plate, and an outer cylindrical section 32 having a cylindrical shape and extending upward from an outer circumferential edge of the fixed-side ring plate 31. The outer circumferential edge of the fixed-side ring plate 31 and a bottom end of the outer cylindrical section 32 are engaged with each other to be integral.

As shown in FIG. 3 and FIG. 4, the outer cylindrical section 32 has a radial-direction two-layer structure including an outside outer cylindrical section 32*o* having a cylindrical shape and an inside outer cylindrical section 32*i* having a cylindrical shape. The inside outer cylindrical section 32*i* has a slightly shorter diameter than a diameter of the outside outer cylindrical section 32*o*. The outside outer cylindrical section 32*o* and the inside outer cylindrical section 32*i* are located concentrically and face each other in a radial direction closely to each other.

As shown in FIG. 4, the inside outer cylindrical section 32*i* has a brim-like guide projection piece 33 in a top portion thereof. The guide projection piece 33 projects inward in the radial direction (radially inner direction) and guides the flat cables C described later from above.

To the stator 30, stator-side connectors 34 are attached.

The stator-side connectors 34 include a first stator-side connector 34A and a second stator-side connector 34B. The first stator-side connector 34A and the second stator-side connector 34B are located with a prescribed distance kept therebetween and outer to the outer cylindrical section 32 (outside outer cylindrical section 32*o*), and connection openings thereof are directed in the same direction.

The stator-side connectors 34 (34A, 34B) are each connected to a cable (not shown) drawn from an electrical circuit or the like on the vehicle body side in a lower column cover (not shown).

As shown in FIG. 2 through FIG. 4, inside the cable housing 10*a* formed of the stator 30 and the rotator 20 which are assembled together in the rotation axis direction of the steering wheel, the fixed-side ring plate 31 of the stator 30 faces the rotatable-side ring plate 21 of the rotator 20 in the rotation axis direction, and the outer cylindrical section 32 of the stator 30 is located outer to the inner cylindrical section 22 of the rotator 20 in the radial direction and faces the inner cylindrical section 22. Thus, an accommodation space S is formed.

The accommodation space S accommodates the retainer 40 and the flat cables C.

As shown in FIG. 2 through FIG. 4, the retainer 40 includes a plurality of rotatable rollers 45 and a base ring 41. The retainer 40 is located on the bottom surface of the stator 30 which forms the accommodation space S and is rotatable, with the rotation axis of the rotator 40 being the rotation center.

The base ring 41 includes a plate-like base ring main body 42 having a ring shape when seen in a plan view, roller supporting projection sections 43, and roller outside projection sections 44.

The rotatable rollers 45 and the roller supporting projection sections 43 will be described in detail later, and here will be described briefly.

The base ring main body 42 is located on the fixed-side ring plate 31 so as to be slidable in a rotation direction thereof and is rotatable with respect to the stator 30.

The roller supporting projection sections 43 are provided at an equal interval in a circumferential direction of the base ring main body 42, and project upward so as to be capable of axially supporting the rotatable rollers 45.

The roller outside projection sections 44 are provided between the roller supporting projection sections 43 and each project upward with respect to the base ring main body 42 so as to guide a turned-around part (reversed part Cr described later) of flat cables C, which is turned around and wound along the corresponding rotatable roller 45 as described later, from a radially outer side.

The rotatable rollers 45 are provided by the same number as that of the roller supporting projection sections 43, and are axially supported by the roller supporting projection sections 43 respectively. The rotatable rollers 45 are each provided to be rotatable, with an axis parallel to the rotation axis of the rotator 20 being the rotation center.

Two flat cables C are accommodated in the accommodation space S, and are wound around therein in a layered state. The flat cables C electrically connect the first rotator-side connector 23A and the first stator-side connector 34A to each other, and also electrically connect the second rotator-side connector 23B and the second stator-side connector 34B.

This will be described in more detail. One of the two layered flat cables C is connected to the first rotator-side connector 23A at one end in a length direction thereof and is connected to the first stator-side connector 34A at the other end.

The other of the two layered flat cables C is connected to the second rotator-side connector 23B at one end in the length direction thereof and is connected to the second stator-side connector 34B at the other end.

Such flat cables C are supported by the retainer 40 located to be rotatable with respect to the fixed-side ring plate 31 and is accommodated in a wound state in the accommodation space S in the cable housing 10*a*.

This will be described in more detail. The flat cables C are drawn into the accommodation space S from the first stator-side connector 34A and the second stator-side connector 34B respectively. Thus, as shown in FIG. 3 and FIG. 4, an outside wound part Co is formed which is wound along an inner circumferential surface of the outer cylindrical section 32 (inside outer cylindrical section 32*i*) of the stator 30 at a position outer to the retainer 40.

Accordingly, base ends of the outside wound part Co are fixed at the positions of the stator-side connectors 34.

The two flat cables C are wound around in the accommodated space S in a layered state as described above, but in FIG. 3 and FIG. 4, such a structure is simplified and only one wound flat cable C is shown.

As represented by the two-dot chain line in FIG. 3, the flat cables C have the reversed part Cr in the middle thereof in the length direction. The reversed part Cr is turned around in a U shape and wound along one of the plurality of rotatable rollers 45.

After this part, tip ends of the flat cables C in the length direction is formed to be an inside wound part Ci which is wound along an outer circumferential surface of the inner cylindrical section 22 of the rotator 20 at a position inner to the retainer 40. The flat cables C are finally drawn out of the accommodation space S and connected to the first rotator-side connector 23A and the second rotator-side connector 23B, respectively.

Accordingly, the tip ends of the inside wound part Ci are fixed at the positions of the rotator-side connectors 23.

As described above, by the rotation of the rotator 20 with respect to the stator 30, the outside wound part Co and the inside wound part Ci of the flat cables C are respectively wound and unwound, or vice versa, in the accommodation space S.

In this state, the reversed part Cr of the flat cables C is appropriately rotated together with the retainer 40 so as to follow the change of balance in the wound state between the outside wound part Co and the inside wound part Ci. Owing to this, the steering roll connector 10 can always hold the flat cables C in an aligned wound state in the accommodation space S and can rotate the steering wheel smoothly.

Now, a structure of the rotation lock structure 50 mentioned above will be described in detail. As shown in FIG. 2, the rotation lock structure 50 includes a rock body 51, a spring receiving sleeve 53, and a return spring 52 provided between the lock body 51 and the spring receiving sleeve 53.

By pressing up the spring receiving sleeve 53 against an urging force of the return spring 52, the rotator 20 can be locked by means of the lock body 51 so as not to be rotated with respect to the stator 30. Alternatively, by inserting a boss section (not shown) of a core bar of the steering wheel into the lock structure 50, the rotator 20 can be released from the locked state provided by the lock body 51 and is permitted to be freely rotatable with respect to the stator 30.

Now, with reference to FIG. 5 through FIG. 7B, the roller supporting projection sections 43 and the rotatable rollers 45 axially supported by the roller supporting projection sections 43 in the steering roll connector 10 as described above will be described in detail.

Figure 5:
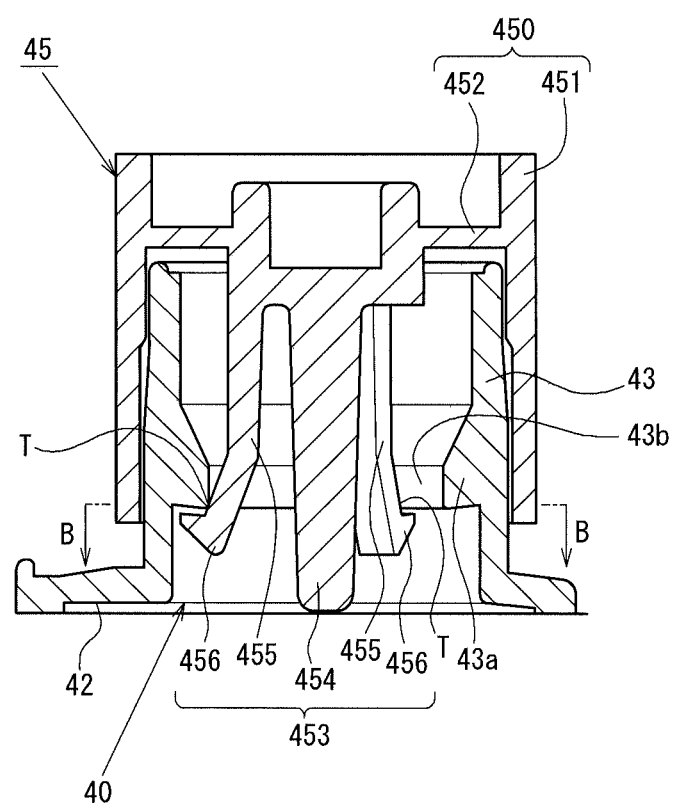
FIG. 5 is a cross-sectional view showing a state where a rotatable roller is axially supported by a roller supporting projection section.
Figure 6A:
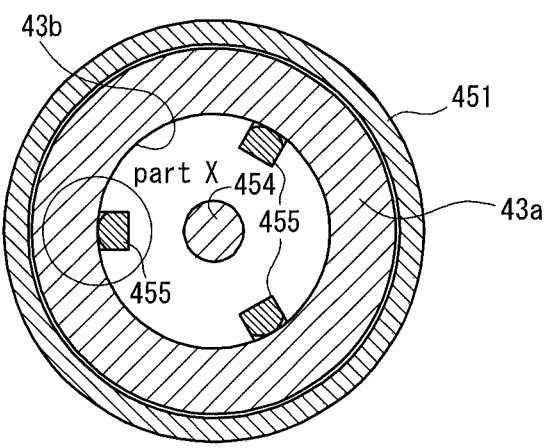
FIGS. 6A and 6B are cross-sectional views taken along line B-B in FIG. 5, which show the rotatable roller and the roller supporting projection section.
Figure 6B:
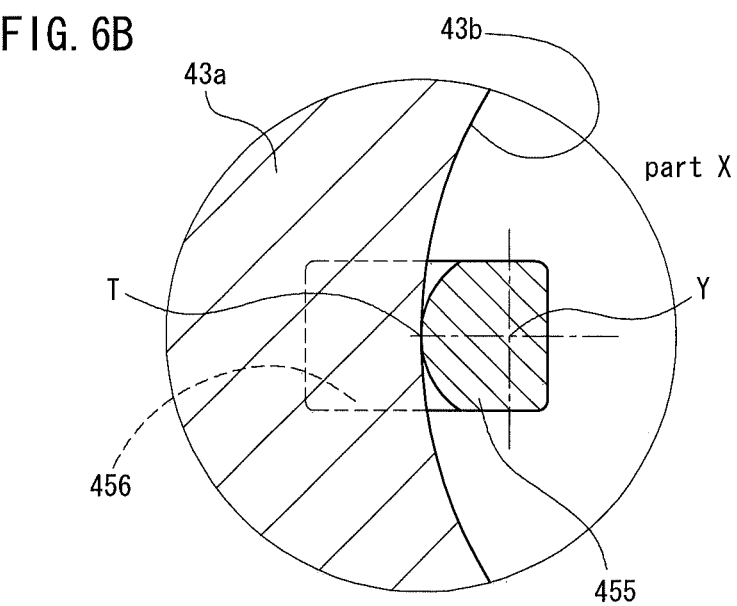

FIG. 5 is a cross-sectional view showing one rotatable rollers 45 axially supported by the corresponding roller supporting projection section 43. FIGS. 6A and 6B are cross-sectional views taken along line B-B in FIG. 5, which show one rotatable roller 45 and one roller supporting projection section 43. FIG. 6A is a cross-sectional view taken along line B-B in FIG. 5, and FIG. 6B is a partial enlarged view of section X of FIG. 6A.

As shown in FIG. 5, the roller supporting projection section 43 is cylindrical and is formed to project upward from the base ring main body 42. The roller supporting projection section 43 has a bearing 43a formed on an inner circumferential surface thereof at or in the vicinity of the center in an axial direction thereof. The bearing 43a projects toward the radial center of the roller supporting projection section 43. An inner circumferential surface 43b of the bearing 43a is coated with a small amount of grease as a lubricant.

The rotatable roller 45 includes a roller main body 450 which contacts the flat cables C and assist the flat cables C in being wound or rewound, and a rotation shaft 453 extending downward in the axial direction from a center of the roller main body 450.

The roller main body 450 includes a cylindrical roller section 451 having a slightly longer inner diameter than an outer diameter of the roller supporting projection section 43 and extending in the axial direction, and a top part 452 located in the vicinity of a top end of the roller section 451. The top part 452 has a constant thickness and is formed to close an area inside the roller section 451.

The rotation shaft 453 has a so-called snap-fit structure including a base part 454, three legs 455, and engaging parts 456. The base part 454 is provided at a center of the top part 452, has a diameter smaller than that of the bearing 43a, and is convexed downward. The three legs 455 are located on a circumference of a root of the base part 454 at an equal interval (see FIG. 6A). The engaging parts 456 are each hook-shaped and extend outward in the radial direction from a tip of the corresponding leg 455.

The legs 455 have a length running through the bearing 43a of the roller supporting projection section 43, and are slowly bent outward in the radial direction so as to contact the inner circumferential surface 43b.

The rotation shaft 453 of the rotatable roller 45 having such a structure is inserted into the bearing 43a of the roller supporting projection section 43 from above, and thus the rotatable roller 45 is axially supported by the roller supporting projection section 43. In this state, as shown in FIG. 5, a sliding part T of each leg 455 of the rotation shaft 453 which is slidable against the inner circumferential surface 43b of the bearing 43a is slightly in contact with the inner circumferential surface 43b in the axial direction.

As shown in FIG. 6B, in a radial-direction cross-section of the sliding part T of each leg 455 which is slidable against and the inner circumferential surface 43b, a surface of the leg 455 facing the inner circumferential surface 43b protrudes in a mountain-like shape toward the inner circumferential surface 43b.

This will be described in more detail. FIG. 6B is an enlarged view of one of the legs 455 (part X) in FIG. 6A. As shown in FIG. 6B, the surface of the leg 455 facing the inner circumferential surface 43b is formed in an arc shape having a constant radius of curvature and centered around center Y. This arc shape has a smaller radius of curvature than that of the inner circumferential surface 43b. Namely, the center Y is different from the center of the inner circumferential surface 43b, and is set inner, in the radial direction, with respect to the inner circumferential surface 43b.

Since the surface of the leg 455 facing the inner circumferential surface 43b is arc-shaped, the leg 455 has a point-contactable cross-sectional shape which is point-contactable with the inner circumferential surface 43b in the radial-direction cross-section of the sliding part T.

Owing to the above-described structure, the rotation shaft 453 and the bearing 43a can slide against each other in a line-contact state in the axial direction. Therefore, the size of an area in the sliding part T of the rotation shaft 453 which slides against the bearing 43a can be decreased. Thus, a foreign object does not easily enter the sliding part T of the rotation shaft 453 against the bearing 43a. Even if being stuck at the sliding part T, the foreign object can be easily removed.

In addition, the risk that the rotatable rollers 45 rotate while a foreign object is stuck at the sliding part T of the rotation shaft 453 against the bearing 43a can be reduced. Thus, generation of burr or fin at the sliding part T of the rotation shaft 453 or on the inner circumferential surface 43b of the bearing 43a due to the foreign object can be suppressed. Since generation of damage due to the foreign object can be suppressed, the rotatable rollers 45 can rotate smoothly without being stuck.

The surface of the leg 455 facing the inner circumferential surface 43b protrudes in a mountain-like shape toward the inner circumferential surface 43b. Therefore, even if the leg 455 is inclined or twisted at the time when the rotation direction of the rotatable roller 45 is changed by the flat cables C being wound or rewound, the sliding part T can be kept in line-contact with the inner circumferential surface 43b in the axial direction.

In addition, the mountain-like protrusion is formed in an arc shape having the center Y which is different from the center of the inner circumferential surface 43b, namely, having a radius of curvature smaller than that of the inner circumferential surface 43b. Owing to this, the sliding part T can be stably kept in line contact with the inner circumferential surface 43b even if the leg 455 is inclined or twisted.

A corner of the surface of the leg 455 facing the inner circumferential surface 43b can move without contacting the inner circumferential surface 43b. Therefore, burr formed at the corner during the molding is not caught at the sliding part T. Thus, smooth rotation of the rotatable roller 45 is not inhibited by such burr, and a situation where the burr at the corner comes off and acts as a foreign object is prevented. In addition, a situation can be prevented where at the time when the rotation direction of the rotatable roller 45 is to be changed, the corner contacts the inner circumferential surface 43b and causes the rotatable roller 45 to be stuck and inhibited from smoothly inverting the rotation direction thereof.

The engaging part 456 is hook-shaped. Therefore, the rotatable roller 45 is firmly engaged with a circumferential edge of the bearing 43a and thus is restricted from moving in the axial direction by an external force such as vibration or the like. In addition, the rotation shaft 453 is prevented from easily coming off from the bearing 43a, and thus a rotation fault of the rotatable roller 45 can be avoided.

In this manner, the rotatable rollers 45 can rotate more smoothly. Therefore, the flat cables C can be smoothly wound or rewound along the rotatable rollers 45. Thus, a situation can be prevented where the steering roll connector 10 causes the user to feel that the steering operation is stuck by something, or where the modules electrically connected to the steering wheel are made inoperable.

At a low temperature, the viscosity of the grease used to coat the inner circumferential surface 43b may be decreased and this may inhibit the smooth rotation of the rotatable rollers 45. However, since the sliding area size of the sliding part T is decreased, the rotation of the rotatable roller 45 is not easily influenced by such a change of viscosity of the grease.

In this embodiment, the sliding part T is point-contactable with the inner circumferential surface 43b also in the axial direction. Alternatively, the leg 455 and the inner circumferential surface 43b may slide against each other in point contact. Still alternatively, the sliding part T of the leg 455 may be line-contactable with the inner circumferential surface 43b over a width smaller than a circumferential-direction width of the leg 455 in a radial-direction cross-section of the sliding part T, while being in contact with the inner circumferential surface 43b to a certain degree, namely, in a plane contact with the inner circumferential surface 43b, in the axial direction of the rotation shaft 453.

In this embodiment, the rotation shaft 453 slides against the inner circumferential surface 43b of the bearing 43a. The rotation shaft and the bearing may be structured such that the rotation shaft slides against an outer circumferential surface of the bearing.

In the embodiment, the sliding part T of the leg 455 protrudes in a mountain-like shape. Alternatively, the entirety of the leg 455 and the engaging part 456 may protrude in the mountain-like shape.

The rotatable connector device according to the present invention corresponds to the steering roll connector 10 in the embodiment; and in the same manner, the circumferential surface corresponds to the inner circumferential surface 43b.

However, the present invention is not limited to the above-described embodiment, and can be implemented in many other embodiments.

Figure 7A:
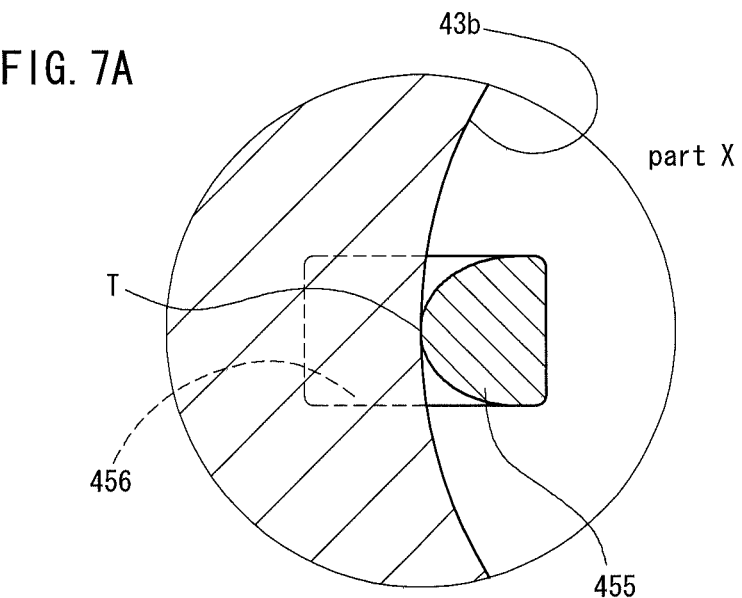
FIGS. 7A and 7B are radial-direction cross-sectional views in another embodiment.
Figure 7B:
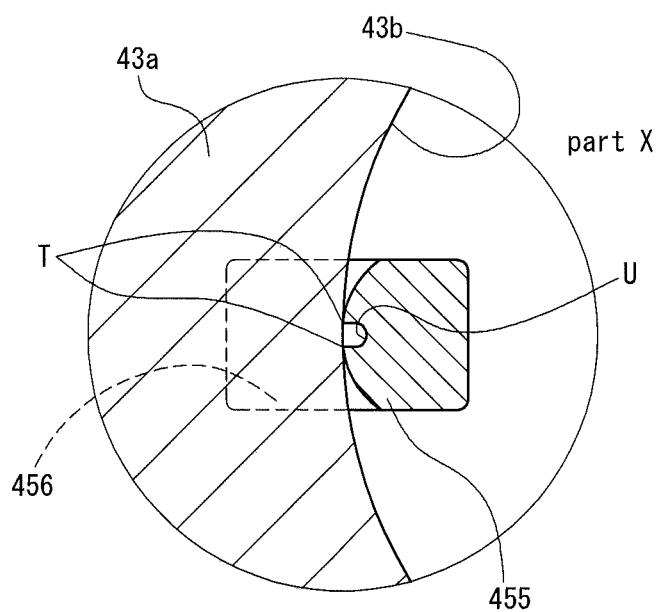
Figure 8A:
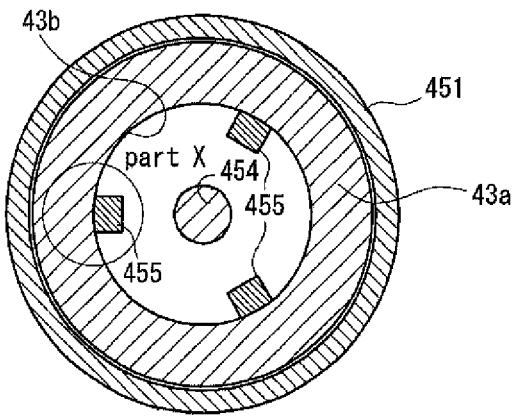
FIGS. 8A and 8B are cross-sectional views of a conventional rotatable roller.
Figure 8B:
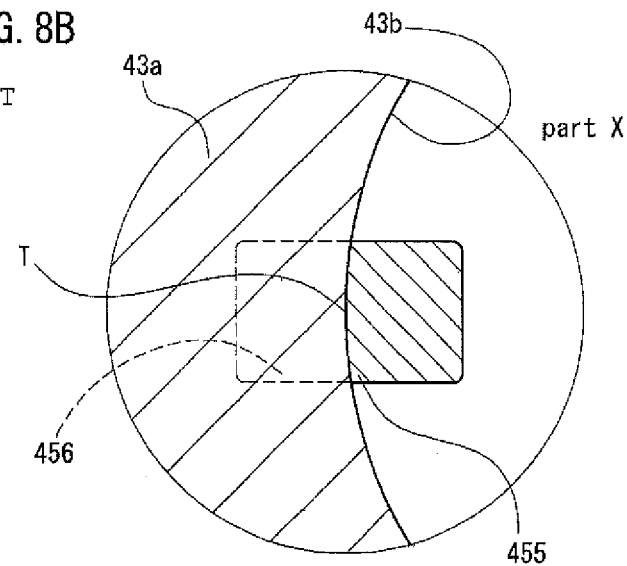

FIG. 7A is a radial-direction cross-sectional view in another embodiment. As shown in FIG. 7A, the part facing the inner circumferential surface 43b in the radial-direction cross-section may have a shape of a curved part of an elliptic shape. Alternatively, as shown in FIG. 7B, a groove U may be formed at or in the vicinity of an apex of the protrusion facing the inner circumferential surface 43b in the radial-direction cross-section, so that one leg 455 has two sliding parts T. In this state, the recess U acts as a receptacle of grease, and can supply the grease to the inner circumferential surface 43b when necessary along with the rotation of the rotatable roller 45.

REFERENCE SIGNS LIST

10 . . . Steering roll connector
20 . . . Rotator
21 . . . Rotatable-side ring plate
22 . . . Inner cylindrical section
30 . . . Stator
31 . . . Fixed-side ring plate
32 . . . Outer cylindrical section
40 . . . Retainer
43a . . . Bearing
43b . . . Inner circumferential surface
45 . . . Rotatable roller
453 . . . Rotation shaft
455 . . . Leg
456 . . . Engaging part
C . . . Flat cable
S . . . Accommodation space
T . . . Sliding part

The invention claimed is:

1. A rotatable connector device, comprising:
a rotator including a ring-shaped rotatable-side ring plate and an inner cylindrical section having a cylindrical shape and formed along an inner circumferential edge of the rotatable-side ring plate, and a stator including a ring-shaped fixed-side ring plate and an outer cylindrical section having a cylindrical shape and formed along an outer circumferential edge of the fixed-side ring plate, the rotator and the stator being engaged with each other so as to be rotatable with respect to each other in a clockwise direction and a counterclockwise direction;
wherein:
an accommodation section is defined by the rotatable-side ring plate and the inner cylindrical section of the rotator and the fixed-side ring plate and the outer cylindrical section of the stator;
a ring-shaped retainer for axially supporting a plurality of rotatable rollers is located on a bottom surface of the accommodation section;
in a part of the accommodation section above the retainer, flat cables for electrically connecting the rotator and the stator to each other are accommodated along the rotatable rollers, such that the flat cables are wound and rewound;
bearings provided in a circumferential direction of the retainer axially support, respectively, rotation shafts included in the rotatable rollers such that the rotation shafts are rotatable;
each of the rotation shafts includes a plurality of legs located in a circumferential direction thereof and each having a sliding part slidable against a circumferential surface of the bearing, and an engaging part formed at a tip of each leg and engageable with a circumferential edge of the bearing; and
at least the sliding part of each leg is formed to have a radial-direction cross-sectional shape which is point-contactable with the bearing, or line-contactable with the bearing over a contact width smaller than a circumferential-direction width of the leg.

2. The rotatable connector device according to claim 1, wherein a part of the radial-direction cross-section facing the bearing has a protruding part protruding in a mountain-like shape toward the bearing.

3. The rotatable connector device according to claim 1, wherein the protruding part has a radius of curvature smaller than that of the bearing.

4. The rotatable connector device according to claim 1, wherein the engaging part is hook-shaped and projects in the radial direction to be engaged with the circumferential edge.

* * * * *